Nov. 6, 1923.
F. A. EUSTIS
1,472,828
APPARATUS FOR MAKING HYDROSULPHITES
Filed May 7, 1921
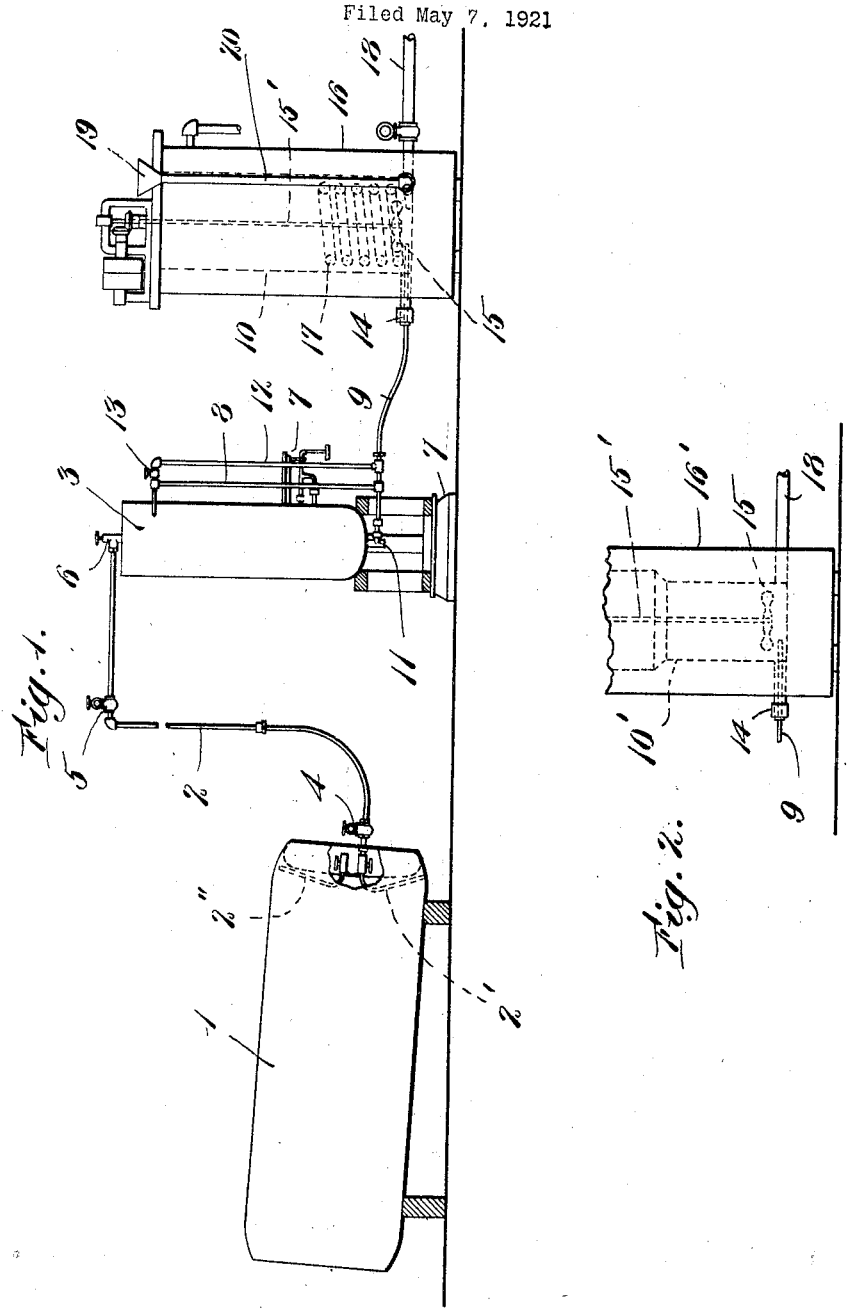
Inventor:
Frederic A. Eustis
by Roberts, Roberts & Cushman
Attys Patented Nov. 6, 1923.

1,472,828

UNITED STATES PATENT OFFICE.

FREDERIC AUGUSTUS EUSTIS, OF MILTON, MASSACHUSETTS.

APPARATUS FOR MAKING HYDROSULPHITES.

Application filed May 7, 1921. Serial No. 467,691.

*To all whom it may concern:*

Be it known that I, FREDERIC A. EUSTIS, a citizen of the United States of America, and resident of Milton, in the county of Norfolk and State of Massachusetts, have invented new and useful Improvements in Apparatus for Making Hydrosulphites, of which the following is a specification.

The hydrosulphites are unstable compounds. They are used extensively for reducing vat dyes, for stripping colors, and for other purposes. They usually come on the market as dry powder which is expensive because these powders are made from solution and then dried, and there is a large loss in the drying up of the solution. Some users make their own solution of hydrosulphite from bisulphite or $SO_2$ and zinc dust, but heretofore this has been a cumbersome operation and one that generally gave variable and somewhat unsatisfactory results.

I have devised apparatus for making hydrosulphite solution that gives uniform and high yield. I make the hydrosulphite solution from pure concentrated sulphur dioxide and a suitable soluble metal such as zinc, which is used in the form of dust suspended in water. These act together to form the hydrosulphite salt of metal, as for instance, zinc hydrosulphite. If sodium hydrosulphite is desired either caustic or carbonate soda may be added, which precipitates the zinc and forms sodium hydrosulphite.

The liquid $SO_2$ is preferably used from a large storage tank or container, but any size or kind of container may be used. It is important to measure accurately the amount of $SO_2$ that is used, and it is important to introduce this into the mixing tank at a uniform rate.

It is also important that at no time should there be at any place in the mixing tank an excess of $SO_2$ as compared with the zinc or other metal. To insure this it is advisable to provide at least a small excess of the metal.

The action between the $SO_2$ and the zinc or other metal generates heat. The temperature in all parts of the mixing tank must be carefully controlled, and never allowed to rise unduly. It is preferably kept below 120° F. as the solution will decompose at higher temperatures.

It is also important to keep air away from the solution thus minimizing the chance of oxidation and to this end the surface of the solution should be disturbed as little as possible. It is also advantageous to protect the surface of the solution with a blanket of $CO_2$ or other inert gas.

My apparatus accomplishes all of the above desired ends.

$SO_2$ boils at an atmospheric pressure at about —10° C. Therefore, at usual temperatures it is in practice always under pressure and can be drawn from a container by simply opening a valve. If the $SO_2$ container be kept out of doors and should fall below about —10° C. in very cold weather, the pressure may be maintained by warming the container, or by introducing air to increase the pressure.

In commercial works, it is a great convenience to keep the $SO_2$ in quantity and to pipe it to the places where it is used. My apparatus is designed to give this advantage.

In the accompanying drawings which are to a great extent diagrammatic in form, and which illustrate a preferred embodiment of the invention,—

Figure 1 shows the apparatus as a whole in side elevation; and

Figure 2 illustrates a modification of the mixing tank.

The container in which liquid sulphur dioxide ($SO_2$) is stored is shown at 1. A pipe 2, detachably joined to an extension 2' within the container, which leads from the lowermost point inside of the container through the wall of the container, connects with the top of the measuring tank 3, which is the supply tank for delivering a measured quantity of the sulphur dioxide to the mixing tank. The pipe connection 2 is provided with a valve 4 which is placed as close as practicable to the container 1. A separate pipe section 2" similar to 2' may be conveniently used to introduce air into the container, if required, or to be connected to pipe 2 if the container be turned top for bottom. When the container is empty the valve 4 is closed and the liquid in the pipe line 2 is thus confined. A full container is then connected and the valve 4 again opened and left open until the container is again empty. The flow of the liquid sulphur dioxide from the container to tank 3 is controlled by a valve 5 placed near the tank 3. A supplementary or emergency valve 6 may also be provided if desired.

The amount of $SO_2$ used with each batch of material in the mixing tank is measured, either by weight or by volume, in the tank 3. For example, the $SO_2$ required will be about one and one-half the amount of zinc dust by weight; and the quantity of water used in the mixing tank will depend on the concentration of hydrosulphite desired. If the $SO_2$ is to be measured by weight the tank 3 will be mounted on platform scales 7. If it is to be measured by volume the tank 3 may be provided with a sight glass or gage glass 8 with which is associated a suitable measuring scale or table to indicate the quantities contained in the tank at various levels. The top of the glass 8 communicates with the tank near its upper part, and the lower end of the glass extends at least as low as the bottom of the tank, and preferably below, and communicates with the tank through the bottom, thus showing when the tank is entirely emptied, and serving as a useful visual aid to determine the quantity of liquid in the tank even when the liquid is measured by weight instead of by volume; this is a great practical convenience, particularly to unskilled operators, and admirably suits mill conditions.

A uniform flow of $SO_2$ into the mixing tank 10 is secured by passing it from the bottom of tank 3 through a short pipe or hose 9 which is made of such proportions that the loss of head caused by the flow of the liquid through the pipe or hose at the desired rate will just balance the pressure in the weighing or measuring tank, which pressure is a function of the temperature in the room. The rate of flow may be altered slightly by a throttle valve, but I have found by experience that if the flow is controlled by a restricted orifice such as a throttle serious trouble is caused from freezing which results from the sudden expansion of the fluid after passing the orifice, thereby plugging the pipe close to the orifice or throttle valve; whereas the present arrangement of a pipe of uniform and relatively small diameter or cross-section avoids these troubles and gives the desired uniform flow, as it provides an elongate orifice adapted to control the rate of flow without sudden expansion of the sulphur dioxide in the connection to the mixing tank.

The connection 9 is controlled by the valve 11 at the bottom of tank 3.

If the pressure in tank 3 becomes excessive on account of the room temperature in which the tank is located, or for any other reason, so as to overbalance the pressure in the storage container 1 and thereby prevent the flow of the liquid $SO_2$ from the container into the measuring tank, or so as to force the liquid too rapidly into the mixing tank, the pressure may be reduced by opening the valve 13 in a by-pass pipe or pressure reducing pipe 12, and closing valve 11. The pipe 12 leads from the upper part of tank 3 to the connection 9 between the tank 3 and the mixing tank 10 at a point beyond the control valve 11. When valve 13 is opened the $SO_2$ in tank 3 will be volatilized thereby rapidly reducing the temperature and consequently the pressure in tank 3. Any volatilized $SO_2$, escaping through pipe 12 will pass into the mixing tank 10 where it will do no harm.

The hose or pipe 9 is introduced into the bottom of the mixing tank 10 through a stuffing box 14. This arrangement permits the placing of the delivery end of pipe 9 at just the desired point in the region of the propeller or other agitator, where the agitation of the solution is the most active, and at the proper distance from the center of the mixing tank.

In the mixing tank 10 the desired mixing of the $SO_2$ with the solution without undue breaking of the surface, is secured by causing a propeller 15 with relatively wide blades to rotate rapidly (say 120 R. P. M. for a 14" propeller in an 18" tank) near the bottom of the tank. The propeller is arranged to lift the solution, that is, produce an upward current at the middle of the tank. The pipe 9 is made to discharge the $SO_2$ close to and preferably just under the propeller and at a point about five-sixths of the distance from the center of the propeller shaft 15' to the circumference of the circle described by the tips of the blades of the propeller.

Zinc or other metallic dust is kept in suspension in the solution by the action of the propeller, and the $SO_2$ as it enters meets a swirling mass of zinc dust and water such that by no possibility will an excess of $SO_2$ occur at any point.

The mixing tank 10 is preferably made more than two and one-half times as tall as its diameter so that the surface of the solution may be so far removed from the propeller that the surface will not be unduly broken by the agitation which is violent at the bottom where the $SO_2$ is introduced. Violent agitation or breaking of the surface of the solution promotes oxidation by contact with any air which may be on the surface of the solution and this is to be avoided.

Access of air to the surface of the liquor and consequent oxidation may further be minimized by placing a cover on the mixing tank (not necessarily sealed) which helps to confine an atmosphere of sulphur dioxide in contact with the surface of the liquor while the hydrosulphite is being made, thus excluding air. After the hydrosulphite is made, if it is still kept in the mixing tank, it may be protected from oxidation by introducing $CO_2$ gas or other inert gas heavier than air into the tank on top of the liquor, to form a $CO_2$ or other non-oxidizing atmosphere in contact with the surface of the liquor thereby excluding air. The $CO_2$ gas may be run in from any convenient source. Or, it may be produced during the latter stages of the process by putting in sodium carbonate just before or with the caustic solution, when the latter is used as hereinafter described, and before neutralization is complete. This forms $CO_2$ with any acid, such as sulphurous acid, in the liquor. The $CO_2$ gas rises to the top and forms a protective atmosphere on the surface of the liquor.

The reaction between the sulphur dioxide and zinc or other metal generates heat. In order to avoid overheating the solution the mixing tank 10 is cooled by a water-jacket 16 or by cooling coils 17, or both. The total cooling surface exposed to the liquor should in practice be at least 2½ square feet per cubic foot of solution capacity. To obtain this ratio of cooling surface to capacity in large tanks, it is necessary to use cooling coils, or both cooling coils and water-jacket.

If the solution gets too hot it decomposes and loses much of its chemical reducing power. If the cooling is not ample, it is necessary to regulate very carefully the rate of flow of the $SO_2$ which controls the rate of generation of heat. For practical work in commercial mills without too expensive supervision, it is important to avoid the necessity for very accurate control. This can be done by supplying an excess of cooling capacity.

It will be noted that the cooling coils 17 are located only in the lower part of the mixing tank, where the greatest amount of heat is generated by the reaction of the incoming sulphur dioxide. But there is another reason for placing the coils near the bottom of the tank. If it is desired to make a much smaller batch of hydrosulphite than the normal capacity of the tank, a difficulty would be encountered in that the depth of the solution as compared with its transverse dimensions would not be sufficient to prevent violent agitation of the surface. The presence of the cooling coils 17 reduces the capacity of the lower part of the tank and makes the tank capable of treating a smaller quantity of liquor than would otherwise be possible. A similar result could be accomplished by making the tank itself smaller at the lower part than at the upper part as shown in Fig. 2 at 10'. Such tank should be cooled by a water jacket 16', supplemented by interior cooling coils if necessary.

It is also a safeguard to have an excess of zinc or other metal in the mixing tank. The presence of an excess of $SO_2$ at any given point causes an acid condition which breaks down the hydrosulphite. In concentrated solutions there is less danger of this acid condition than in dilute solutions because with such concentrated solutions a given percentage of excess zinc or other metal gives more complete protection. This occurs because in any part of the concentrated solutions exposed to the action of the $SO_2$ there are more particles of zinc present than in a similar part of a more dilute solution.

The action between the $SO_2$ and the zinc forms zinc hydrosulphite. This may be run out of the tank by a pipe 18, and filtered if desired, or used unfiltered.

If sodium hydrosulphite is desired, caustic solution is added through the funnel 19 and pipe 20. This discharges into tank 10 close to the propeller where the agitation is most violent. The caustic soda reacts with zinc hydrosulphite forming sodium hydrosulphite and precipitating the zinc probably as hydrate. This precipitate is at first very heavy and tends to form a massive cake, but if the same is formed close to the violent agitation the cake breaks up and the whole cake can be handled as an emulsion. If the caustic were simply poured into the top of the mixing tank F, a heavy cake of precipitate would be formed on the top of the solution which would be very hard to break up and hard to handle.

The reaction with the caustic also generates heat and the caustic must be added at such a rate that the temperature will not rise unduly. In practice it is recommended that the temperature be kept below 120° F.

After the action of the caustic is complete, the whole contents of the mixing tank may be withdrawn by pipe 18 and used as it is, or it may be filtered and the clear solution of sodium hydrosulphite used.

By using the appropriate amounts of water, $SO_2$ and zinc or other metal, absolutely concentrated solutions of zinc or soda hydrosulphite may be made. The zinc hydrosulphite is much more soluble than the sodium hydrosulphite.

I claim:

1. Apparatus for making hydrosulphites comprising a storage container for liquid sulphur dioxide, a measuring tank, a valve controlled pipe between the container and the measuring tank detachably connected to the container and delivering from the container into the measuring tank, a mixing tank, and a valve controlled connection between the measuring tank and the mixing tank delivering from the measuring tank into the mixing tank.

2. Apparatus for making hydrosulphites comprising a storage container for liquid sulphur dioxide, a measuring tank, a valve controlled pipe between the container and the measuring tank detachably connected to the container and delivering from the container into the measuring tank, a mixing tank, and a valve controlled connection between the measuring tank and the mixing tank delivering from the measuring tank into the mixing tank adapted to control the rate of flow therethrough without permitting the sudden expansion of the sulphur dioxide in said connection.

3. Apparatus for making hydrosulphites comprising a storage container for liquid sulphur dioxide, a measuring tank, a valve controlled pipe between the container and the measuring tank detachably connected to the container and delivering from the container into the measuring tank, a mixing tank, and a valve controlled connection between the measuring tank and the mixing tank delivering from the measuring tank into the mixing tank having an elongate orifice of substantially uniform and relatively small cross section, adapted to control the rate of flow therethrough without sudden expansion of the sulphur dioxide in said connection.

4. Apparatus for making hydrosulphites comprising a supply tank for holding a measured quantity of liquid sulphur dioxide, a mixing tank, and a valve controlled connection between the supply tank and the mixing tank adapted to control the rate of flow therethrough without permitting the sudden expansion of the sulphur dioxide in said connection.

5. Apparatus for making hydrosulphites comprising a supply tank for holding a measured quantity of liquid sulphur dioxide, a mixing tank, and a valve controlled connection between the supply tank and the mixing tank having an elongate orifice of substantially uniform and relatively small cross section adapted to control the rate of flow therethrough without sudden expansion of the sulphur dioxide in said connection.

6. Apparatus for making hydrosulphites comprising a mixing tank whose height is great as compared with its transverse dimensions, the capacity of the lower part of the tank being smaller than that of the upper part of the tank, an agitator near the bottom of the mixing tank, and means to deliver sulphur dioxide into said tank in the region of the agitator.

7. Apparatus for making hydrosulphites comprising a mixing tank, means located inside of the tank for cooling the contents of the tank, an agitator in the mixing tank, and means to deliver sulphur dioxide into said tank in the region of the agitator.

8. Apparatus for making hydrosulphites comprising a mixing tank, cooling coils in the lower part of the mixing tank adapted both to circulate a cooling medium and to reduce the capacity of the lower part of the tank, an agitator in the lower part of the tank, and means to deliver sulphur dioxide into the lower part of the tank in the region of the agitator.

9. Apparatus for making hydrosulphites comprising a mixing tank means located inside of said tank for cooling the contents of the tank, an agitator in the bottom of the mixing tank, means to deliver sulphur dioxide into the bottom of the tank in the region of the agitator, and separate means to deliver a soda solution into the bottom of the tank.

10. Apparatus for making hydrosulphites comprising a storage container for liquid sulphur dioxide, a measuring tank, a valve controlled pipe connecting the container and the measuring tank, and means to control the pressure within the measuring tank whereby the pressure therein may at all times be kept below the pressure within the container.

11. Apparatus for making hydrosulphites comprising a storage container for liquid sulphur dioxide, a measuring tank, a valve controlled pipe connecting the container and the measuring tank, a mixing tank, a valve controlled connection between the measuring tank and the mixing tank, and a valve controlled pressure reducing pipe leading from the upper part of the measuring tank to the connection between the measuring tank and the mixing tank at a point beyond the control valve in the latter connection.

Signed by me at Boston, Massachusetts, this 2nd day of May 1921.

FREDERIC AUGUSTUS EUSTIS.